United States Patent [19]

Karakane et al.

[11] Patent Number: 4,871,461
[45] Date of Patent: Oct. 3, 1989

[54] POLYMER COMPOSITE MEMBRANE

[75] Inventors: Hiroki Karakane; Yasushi Maeda; Michio Tsuyumoto, all of Himeji, Japan

[73] Assignee: The General Director of the Agency of Industrial Science and Technology, Tokyo, Japan

[21] Appl. No.: 144,812

[22] Filed: Jan. 15, 1988

[30] Foreign Application Priority Data

Jan. 22, 1987 [JP] Japan ................................. 62-11337
Mar. 4, 1987 [JP] Japan ................................. 62-47495
Jul. 3, 1987 [JP] Japan ................................. 62-165284
Jul. 3, 1987 [JP] Japan ................................. 62-165285

[51] Int. Cl.$^4$ ............................................. B01D 13/00
[52] U.S. Cl. ........................................ 210/638; 55/16; 210/640; 210/644; 210/654

[58] Field of Search .................. 210/500.42, 634, 638, 210/640, 642, 644, 649, 650, 651, 652, 653, 654; 55/16, 158

[56] References Cited

U.S. PATENT DOCUMENTS 4,704,324 11/1987 Davis et al. ..................... 210/500.42

Primary Examiner—Frank Sever
Attorney, Agent, or Firm—Flynn, Thiel, Boutell & Tanis

[57] ABSTRACT

A permeable membrane through which water or its vapor permeates selectively and which contains a polyion complex formed by the association by an ionic bond between an anionic polymer and a cationic polymer on the surface of the membrane and/or in the membrane. This membrane is useful in the separation of water from an aqueous solution of an organic substance or a gaseous mixture of water with an organic substance, and exhibits excellent resistance to solvent, particularly water, and a high permeation rate and a high separation coefficient.

14 Claims, No Drawings

POLYMER COMPOSITE MEMBRANE

BACKGROUND OF THE INVENTION

1. Field of the Invention

The present invention relates to a process for separating water from an aqueous solution of an organic substance or a gaseous mixture of water with an organic substance. Particularly, the present invention relates to a separatory membrane used in the above process. More particularly, it relates to a permeable membrane through which water or water vapor can permeate selectively.

2. Description of the Prior Art

With respect to the concentration and separation of an aqueous solution of an organic substance with a membrane, a reverse osmosis method has been practically used for the concentration of some aqueous solutions of an organic substance having a low concentration. However, the reverse osmosis method requires that a pressure higher than the osmotic pressure of the separated solution be applied to the solution to be separated, so that the method can not be applied to an aqueous solution having a high concentration, i.e., a high osmotic pressure. Thus, the concentration of the solution, to which the method can be applied, has an upper limit.

Meanwhile, pervaporation and vapor permeation, both of which are not affected by osmotic pressure, have been spotlighted as new separation methods. Pervaporation is a process which comprises feeding a liquid mixture to be separated to the primary side of a membrane and reducing the pressure of the secondary side (permeation side) of the membrane or passing a carrier gas through the secondary side to thereby make the substance to be separated permeate through the membrane in a gaseous state, while the vapor permeation is different from the above pervaporation in that the mixture to be fed to the primary side of a membrane is gaseous. The membrane-permeating substance can be recovered by cooling and condensing the permeating vapor.

Many studies with respect to the pervaporation have been reported. For example, U.S. Pat. Nos. 3,750,735 and 4,067,805 disclose separation of an organic substance from water with a polymer having an active anionic group, while U.S. Pat. Nos. 2,953,502 and 3,035,060 disclose separation of ethanol from water with a membrane made of cellulose acetate or polyvinyl alcohol. Further, Japanese Patent Laid-Open No. 109,204/1984 discloses a cellulose acetate membrane and a polyvinyl alcohol membrane, while Japanese Patent Laid-Open No. 55,305/1984 discloses a cross-linked polyethyleneimine membrane. However, these membranes all exhibit poor separation performances, i.e., a low permeation rate and a low separation coefficient, thus being deficient in practicality.

On the other hand, as a membrane excellent in separation performances, Japanese Patent Laid-Open No. 129,104/1985 discloses a membrane made of an anionic polysaccharide. However, a membrane made of a polysaccharide or its derivative essentially has unavoidable problems inherent in natural polymers, for example, depolymerization by acid or alkali or decomposition by fungi, so that the endurance and chemical resistance thereof do not meet expectations.

As described above, the separatory membranes for pervaporation or vapor permeation according to the prior art must have large areas owing to their low permeation rates. Further, in the concentration of a solution to a desired extent with the separatory membrane according to the prior art, the permeation solution of a high concentration must be circulated and re-treated owing to its low separation coefficient. The fulfilment of these requirement disadvantageously enhances the cost of equipment or operation.

The term "permeation rate" as used in this specification refers to the amount of a mixture permeating a membrane per unit area and per unit time and is shown by $kg/m^2 \cdot hr$, while the term "separation coefficient $(\alpha)$" refers to the ratio of water to an organic substance contained in the permeation gas to that of the same substances present in the feed solution or vapor, i.e., $\alpha = (X/Y_p)/(X/Y)_f$, wherein X and Y stand for proportions of water and an organic substance in the two-component system, respectively, and p and f stand for "permeation" and "feed", respectively.

An object of the present invention is to provide a separatory membrane used for separating water from an aqueous solution of an organic substance or a gaseous mixture of an organic substance with water by pervaporation or vapor permeation, wherein said membrane exhibits a sufficiently enhanced endurance, a high permeation rate and a high separation coefficient over a wide concentration range of an organic substance in a feed solution.

In order to make the water contained in an aqueous solution of an organic substance or in a gaseous mixture of an organic substance with water permeate a membrane selectively, it is preferred to introduce a functional group having a high water-coordinating power into the membrane. The water coordinated with a membrane is called bonded water, as contrasted with free water present in a bulk solution. It is presumed that the introduction of a dissociable group which excludes an organic substance and selectively coordinates water will increase the amount of the bonded water present in a membrane, thus remarkably enhancing the selective water-permeability of the membrane. On the basis of this presumption, it is described in the above-mentioned U.S. Pat. Nos. 3,750,735 and 4,067,805 that the separation coefficient of a nonionic polymer membrane can be enhanced by introducing an anionic group therinto. However, most polymers having numerous dissociable groups, such as polyacrylic acid, polymethacrylic acid, carboxymethylcellulose or their salts are soluble in water or highly swellable with water. Therefore, when the aqueous solution to be separated has a high concentration, a membrane made of such a polymer can be used in separation of water from the solution. However, when the solution to be separated has a low concentration, it is dissolved or significantly swollen to exhibit a remarkably lowered separating function. Although the resistance of such a membrane to an aqueous solution of an organic substance of a wide concentration range can be enhanced by converting the polymer of the membrane into a three-dimensional polymer by crosslinking, the crosslinked membrane generally tends to exhibit a lowered permeation rate.

SUMMARY OF THE INVENTION

A polymer aggregate comprising an anionic polymer and a cationic polymer, both of which associate with each other by an ionic bond, is generally called a polyion complex or polyelectrolyte complex. The inventors of the present invention have noted a fact that a membrane of a polyion complex exhibits not only a highly selective water-permeability because it has numerous dissociable groups, but also a high solvent resistance owing to the crosslinking of the molecules by an ionic bond and have eagerly studied to find a material suitable for the preparation of a membrane used for separating water from an organic substance and a process for converting the material into a membrane. As a result of this study, they have accomplished the present invention relating to a polyion complex membrane and a process for the preparation thereof.

The present invention provides the following membranes:

(1) a polymer membrane for separating water from an organic substance by pervaporation or vapor permeation, wherein a synthetic polymer having an anionic group associates with a synthetic polymer having a cationic group by an ionic bond to form a polyion complex on the surface of the membrane and/or in the membrane, (2) a membrane as set forth in the above item (1) wherein the synthetic polymer having an anionic group constituting the polyion complex is crosslinked with a crosslinking agent which can form a covalent bond with the polymer, (3) a membrane as set forth in the above item 1 or 2, wherein said synthetic polymer having an anionic group constituting the polyion complex is polyacrylic acid or a salt thereof with a metal or ammonium., (4) a membrane as set forth in the above item (1), (2) or (3), wherein the cationic group of the synthetic polymer having a cationic group constituting the polyion complex is a primary, secondary, tertiary or quaternary amine, (5) a membrane as set forth in the above item (4), wherein the synthetic polymer having a cationic group constituting the polyion complex is polyallylamine, (6) a membrane as set forth the above item (4), wherein the synthetic polymer having a cationic group constituting the polyion complex is polyethyleneimine, (7) a polyion complex separatory membrane for separating water from an organic substance by pervaporation or vapor permeation, which is a composite membrane constituted by a skin layer essentially made of a polyion complex comprising a synthetic polymer having an anionic group and a synthetic polymer having a cationic group, both of which associate with each other by an ionic bond, and a porous support layer, (8) a polyion complex separatory membrane as set forth in the above item (7), wherein the synthetic polymer having a cationic group is a polymer having a quaternary ammonium salt group in its backbone chain, (9) a polyion complex separatory membrane as set forth in the above item (8), wherein the polymer having a quaternary ammonium salt group in its backbone chain has a structure represented by the following structural formula:

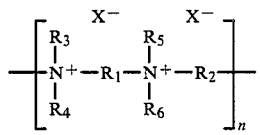

wherein $R_1$ and $R_2$ may be the same or different from each other and each stand for an alkylene group having at least 2 carbon atoms or a hydroxyalkylene, alicyclic or aromatic group; $R_3$, $R_4$, $R_5$ and $R_6$ may be the same or different and each stand for an alkyl or hydroxyalkyl group having 1 to 3 carbon atoms and X is a counter halide ion,

(10) a polyion complex separatory membrane as set forth in the above item (9), wherein the polymer having a quaternary ammonium salt group in its backbone chain has a structure represented by the following structural formula:

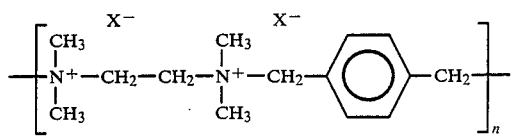

wherein $X^-$ is a counter halide ion,

(11) a polyion complex separatory membrane as set forth in the above item (9), wherein the polymer having a quaternary ammonium salt group in its backbone chain has a structure represented by the following structural formula:

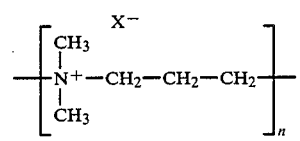

wherein $X^-$ is a counter halide ion, and

(12) a polyion complex separatory membrane as set forth in the above item (9), wherein the polymer having a quaternary ammonium salt group in its backbone chain has a structure represented by the following structural formula:

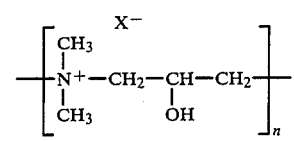

wherein $X^-$ is a counter halide ion.

Further, the present invention provides the following processes for preparing the membranes as described above:

(1) a process for preparing a membrane containing a polyion complex which comprises dipping a membrane made of an anionic polymer is a solution of a cationic polymer to from a polyion complex on the surface of the membrane and/or in the membrane, wherein the membrane made of an anionic polymer is preliminarily insolubilized by crosslinking with a suitable crosslinking agent, (2) a process for preparing a membrane containing a polyion complex which comprises dipping a membrane made of a cationic polymer in a solution of an anionic polymer to from a polyion complex on the surface of the membrane and/or in the membrane, wherein the membrane made of a cationic polymer is preliminarily insolubilized by crosslinking with a suitable crosslinking agent, (3) a process for preparing a polyion complex separatory membrane which comprises dipping a composite membrane obtained by forming a skin layer made of an anionic polymer on a porous polymer membrane in a solution of a cationic polymer to thereby convert the anionic polymer of the skin layer into a polyion complex, (4) a process for preparing a polyion complex separatory membrane as set forth in the above item (3), wherein the anionic polymer constituting the skin layer is polyacrylic acid, and (5) a process for preparing a polyion complex separatory membrane as set forth in the above item (3), wherein the crosslinking agent for insolubilizing the skin layer is a multi-functional epoxy, amine, methylolmelamine or isocyanate compound.

The inventors of the present invention have eagerly studied how to crosslink a polymer having an anionic group and have found that a membrane exhibiting both a high separation performance and a high water resistance can be obtained by making such a polymer associate with a cationic polymer.

Generally, an aggregate comprising polymer molecules which associate with each other by many ionic bonds to form a three-dimensional structure is called polyion complex or polymeric ion complex. The present invention provides a membrane excellent in solvent resistance and having both a high permeation rate and a high separation performance by using such a polyion complex.

DETAILED DESCRIPTION OF THE PREFERRED EMBODIMENTS

Examples of the anionic polymer constituting the polyion complex according to the present invention include polymers having a carboxyl or sulfo group and salts thereof with metals or ammonium. Particular examples thereof include homo- and co-polymers of acrylic acid, methacrylic acid, styrenesulfonic acid, vinylsulfuric acid and so on; alginic acid; carboxymethylcellulose; sulfoethylcellulose and salts thereof with metals or ammonium.

Examples of the cationic polymer constituting the polyion complex include polymers having a primary, secondary, tertiary or quaternary amino group.

The cationic polymer constituting the polyion complex membrane preferably has a structure containing a quaternary ammonium salt group in its backbone chain represented by the following structural formula:

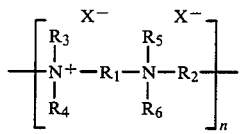

wherein $R_1$ and $R_2$ may be the same or different from each other and each stand for an alkylene group having at least 2 carbon atoms or a hydroxyalkylene, alicyclic or aromatic group; $R_3$, $R_4$, $R_5$ and $R_6$ may be the same or different and each stand for an alkyl or hydroxyalkyl group having 1 to 3 carbon atoms and $X^-$ is a counter halide ion.

The above cationic polymer having a quaternary ammonium salt group in its backbone chain can be easily synthesized by the Menshutkin reaction as follows:

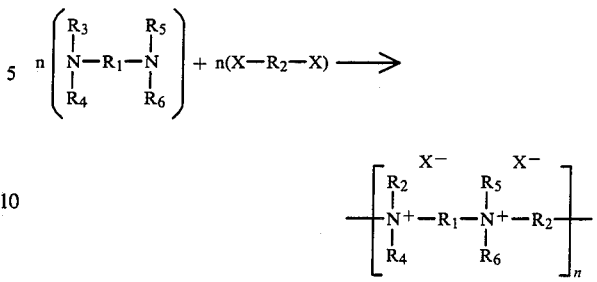

A polyion complex is generally insoluble in any solvent, because molecular chains thereof associate with each other by an ionic bond.

Therefore, the preparation of a polyion complex membrane must be carried out by one of the following processes:

(1) a process which comprises preparing a solution containing both an anionic polymer and a cationic polymer each in such an amount that both polymers do not associate with each other by an ionic bond, casting the solution on a smooth surface of glass or the like and evaporating or replacing the solvent to form a polyion complex membrane, (2) a process which comprises preparing a membrane of either of an anionic polymer and a cationic polymer by casting, casting a solution of the other counter-ionic polymer on the membrane to form a polyion complex in both the surface and the inside of the membrane and (3) a process which comprises preparing a membrane of either of an anionic polymer and a cationic polymer and dipping the membrane in a solution of the other counter-ionic-polymer to make the counter-ionic polymer adsorbed to the membrane, thus forming a polyion complex in both the surface and the inside of the membrane.

The endurance and solvent resistance of the membrane can be further enhanced by crosslinking the membrane by a covalent bond. A membrane made of a highly hydrophilic material, as will be described in Examples hereinbelow, can also keep its separation coefficient at a high level by imparting both the polyion complex structure and crosslinking structure with a covalent bond to thereby reduce the swelling of the membrane with an aqueous solution of an organic substance which is an object of the separation. Although the crosslinking may be carried out by utilizing dissociable groups such as a carboxyl or amino group as well, the extent of the crosslinking must not be so high that the whole or most of the dissociable groups are involved in the crosslinking to result in the failure of forming a polyion complex.

A solution containing either of an anionic polymer and a cationic polymer is mixed with a compound which can react with the polymer to form crosslinkages. The mixture is applied to a porous support with an applicator such as a doctor blade or a wire bar or by dipping, reverse-roll coating, spraying or spin coating, and dried to crosslink the solute simultaneously.

Examples of the crosslinking reactions include those between functional groups of the polymer, such as hydroxyl, carboxyl and primary or secondary amino groups, and groups of the crosslinking agent, such as epoxy, methylol, amino, aldehyde and isocyanate groups.

Further, it is preferred that the crosslinking agent to be used in the present invention be soluble in the same solvent as the one in which the polymer to be crosslinked is soluble, and can react with the polymer in the solution by heating or the action of a suitable catalyst. Particular examples of the crosslinking agent include multi-functional epoxy, methylolmelamine, amine and isocyanate compounds.

The crosslinked anionic or cationic polymer membrane thus prepared is dipped in a solution of a counter-ionic polymer to adsorb the counter-ionic polymer by electrostatic interaction. Thus, a polyion complex is formed on the surface of the membrane and in it. The solution of a counter-ionic polymer to be used in this step preferably contains water or a mixture of water with an organic substance as a solvent, and still preferably, has a solute content of 0.1 to 30% by weight.

The polyion complex composite membrane thus prepared can be used not only in the separation of water from an organic substance by pervaporation or vapor permeation, but also as a reverse osmosis membrane. The form of the membrane may be suitably determined depending upon the material and use of the membrane. For example, the membrane may be flat or tubular or in the form of a hollow yarn.

It is preferable that the membrane have a thickness as small as possible so far as it is free from pinholes. Particularly, the thickness is 10 $\mu$m or below, preferably 5 $\mu$m or below. However, a membrane having a thickness of 10 $\mu$m or below is too deficient in mechanical strength to be used as a separatory membrane which is generally used in a state wherein there is a large pressure difference between both sides of the membrane. Therefore, it is preferable that the membrane as described above be used in a state applied to a porous support as an active skin layer, i.e., as a composite membrane.

The support to be used in the present invention is one having pores of several tens to several thousands of Å on its surface and includes known supports made of polysulfone, polyether sulfone, polyacrylonitrile, cellulose ester, polycarbonate, polyvinylidene chloride or the like. The thickness of the skin layer of a composite membrane can be reduced by reducing the solid content of the solution to be applied to a porous support or by reducing the coating thickness. The membrane according to the present invention may be flat, tubular or hollow. The flat membrane may be formed into a module by direct lamination or after molding it into a pleated or a spiral shape.

The membrane thus prepared is used in the separation of a water/organic substance mixture, for example, aqueous solutions containing one or more compounds selected from the group consisting of alcohols such as methanol, ethanol, 1-propanol, 2-propanol or n-butanol; ketones such as acetone or methyl ethyl ketone; ethers such as tetrahydrofuran or dioxane; organic acids such as formic or acetic acid; aldehydes such as acetaldehyde or propionaldehyde and amines such as pyridine or picoline or gaseous mixtures comprising water and one or more compounds selected from the same group as that described above.

The membrane containing a polyion complex therein and/or on the surface thereof exhibits more excellent separation performances, particularly a higher separation coefficient, and is more excellent in water resistance and endurance than those made of the anionic polymer or the cationic polymer alone, both of which constitute the above polyion complex. Examples The present invention will be further described in more detail by referring to the following Examples.

Example 1

(1) Preparation of polyammonium acrylate composite membrane

An aqueous solution of polyacrylic acid polymerized in a laboratory (viscosity of 1% aqueous solution: 24 cP) was neutralized with aqueous ammonia and diluted with water to give a 0.5% aqueous solution of polyammonium acrylate. This 0.5% aqueous solution was cast on a polyether sulfone ultrafiltration membrane (mfd. by Daicel Chemical Industries, Ltd.; DUS-40) with a wire bar having a wire diameter of 0.15 mm and air-dried with dust-free air in a clean bench to form a polyammonium acrylate coating layer. The same coating as that described above was made on the polyammonium acrylate coating layer to obtain a composite membrane having a skin layer 0.4 $\mu$m thick.

(2) Formation of polyion complex

The polyammonium acrylate composite membrane prepared in the above paragraph (1) was dipped in a 0.5% solution of polyallylamine hydrochloride in an ethanol/water (1:1) mixture at a room temperature for 10 minutes to obtain a polyion complex membrane. The solution used was weakly acidic (pH 3.5).

(3) Evaluation of separation performance

An ethanol/water mixture (of a weight ratio of 95:5) having a gauge pressure of 0.1 kg/cm$^2$ and a temperature of 70° C. was fed to the primary side (skin layer side) of the membrane prepared in the above paragraph (2), while the secondary side thereof was closed. The ethanol/water gaseous mixture permeating the membrane enhanced the pressure of the closed system up to 8 mm Hg. The total molar amount of the membrane-permeating gaseous mixture was calculated from the volume of the closed system and the time taken for the pressure increase. Further, the feed mixture and the gaseous mixture of the closed system were analyzed for composition by gas chromatography and the permeation rate and the separation coefficient were calculated from the results of this analysis.

The permeation rate and separation coefficient thus determined were equal to those calculated from the results of the weighing of the membrane-permeating gaseous mixture trapped with liquid nitrogen and the analysis thereof for composition.

(4) Evaluation results

The results are shown in Table 1.

Example 2

The same procedure as that described in Example 1 was repeated except that the 0.5% solution of polyallylamine hydrochloride to be used in the dipping of the polyammonium acrylate composite membrane in the paragraph (2) was preliminarily made weakly basic, i.e., adjusted to pH 9.2, with 10% aqueous ammonia. The evaluation results of the separation performances are shown in Table 1.

Comparative Example 1

The polyammonium acrylate composite membrane prepared in Example 1 (1) was evaluated in a similar manner to that described in Example 1 (3). The results are shown in Table 1.

The separation coefficient (α) of the membrane was much lower than that of the polyallylamine-treated membranes prepared in Examples 1 and 2, while the permeation rate (Q) of the former is lower than that of the latter.

Example 3

(1) Preparation of polypotassium acrylate composite membrane

The same aqueous solution of polyacrylic acid as that used in Example 1 (1) was neutralized with a 1N aqueous solution of potassium hydroxide and diluted with water to obtain a 1.0% aqueous solution of polypotassium acrylate. This 1.0% aqueous solution was cast on a polyether sulfone ultrafiltration membrane (mfd. by Daicel Chemical Industries, Ltd,; DUS-40) with a wire bar having a wire diameter of 0.15 mm and air-dried with dust-free air in a clean bench to form a polypotassium acrylate coating layer. The same coating as that described above was made on the polypotassium acrylate coating layer to obtain a composite membrane having a skin layer 0.6 μm thick.

(2) Formation of polyion complex

The polypotassium acrylate composite membrane prepared in Example 3 (1) was treated in the same manner as that used in Example 1 (2) to obtain a polyion complex membrane.

(3) Evaluation of separation performance

The evaluation was carried out in a similar manner to that described in Example 1 (3).

(4) Evaluation results

The results are shown in Table 1.

Example 4

The same procedure as that described in Example 3 was repeated except that the 0.5% solution of polyallylamine hydrochloride to be used in the dipping of the polypotassium acrylate composite membrane in the paragraph (2) was preliminarily made basic (pH 10.0) with a 1N aqueous solution of potassium hydroxide. The evaluation results of its separation performances are shown in Table 1.

Comparative Example 2

The polypotassium acrylate composite membrane prepared in Example 3 (1) was evaluated in a similar manner to that described in Example 1 (3). The results are shown in Table 1.

Example 5

(1) Preparation of melamine-crosslinked polyacrylic acid composite membrane

A 0.5% aqueous solution of hexamethoxymethylmelamine was added to a 0.5% aqueous solution of the same polyacrylic acid as that used in Example 1 (1) so as to give a ratio of polyacrylic acid to hexamethoxymethylmelamine of 8:2. The mixture was cast on a polyether sulfone ultrafiltration membrane (mfd. by Daicel Chemical Industries Ltd.; DUS-40) with a wire bar having a wire diameter of 0.15 mm and heated in a clean oven of 100° C. for 10 minutes to form a crosslinked coating layer. The same coating as that described above was made on the coating layer to form a melamine-crosslinked polyacrylic acid composite membrane.

(2) Conversion into potassium salt

The melamine-crosslinked polyacrylic acid composite membrane was dipped in a 10% aqueous solution of potassium hydroxide at room temperature for 10 minutes to convert the polyacrylic acid into its potassium salt.

(3) Formation of polyion complex

The melamine-crosslinked polypotassium acrylate composite membrane prepared in Example 5 (2) was dipped in a 0.5% aqueous solution of polyallylamine hydrochloride adjusted to pH 10.0 with a 1N aqueous solution of potassium hydroxide to obtain a polyion complex membrane.

(4) Evaluation of separation performances

The evaluation was carried out in a similar manner to that described in Example 1 (3).

(5) Evaluation results

The results are shown in Table 1.

Comparative Example 3

The melamine-crosslinked polypotassium acrylate composite membrane prepared in Example 5 (2) was evaluated in a similar manner to that described in Example 1 (3). The results are shown in Table 1.

Although the separation coefficient (α) of the membrane was slightly higher than that of the polyallylamine-treated membrane prepared in Example 5, the permeation rate of the former was about one-third of that of the latter.

Comparative Example 4

The melamine-crosslinked polyacrylic acid composite membrane prepared in Example 5 (1) was evaluated in a similar manner to that described in Example 1 (3). The results are shown in Table 1.

The separation coefficient (α) of the membrane is much lower than that of the polyallylamine-treated membrane prepared in Example 5, while the permeation rate (Q) of the former is lower than that of the latter.

Example 6

(1) Preparation of epoxy-crosslinked polyacrylic acid composite membrane

A 0.5% aqueous solution of ethylene glycol diglycidyl ether was added to a 0.5% aqueous solution of the same polyacrylic acid as that used in Example 1 (1) so as to give a ratio of polyacrylic acid to ethylene glycol diglycidyl ether of 9:1. The mixture was cast on a polyether sulfone ultrafiltration membrane (mfd. by Daicel Chemical Industries Ltd.; DUS-40) with a wire bar having a wire diameter of 0.15 mm and heated in a clean oven of 100° C. for 10 minutes to obtain a epoxy-crosslinked polyacrylic acid composite membrane.

(2) Conversion into potassium salt

The epoxy-crosslinked polyacrylic acid composite membrane prepared in Example 6 (1) was treated in a similar manner to that described in Example 5 (2) to obtain an epoxy-crosslinked polypotassium acrylate composite membrane.

(3) Formation of polyion complex

The epoxy-crosslinked polypotassium acrylate composite membrane prepared in Example 6 (2) was treated in a similar manner to that described in Example 5 (3) to obtain a polyion complex composite membrane.

(4) Evaluation of separation performances

The evaluation was carried out in a similar manner to that described in Example 1 (3.

(5) Evaluation results

The results are shown in Table 1.

Comparative Example 5

The epoxy-crosslinked polypotassium acrylate composite membrane prepared in Example 6 (2) was evaluated in a similar manner to that described in Example 1 (3). The results are shown in Table 1.

The permeation rate (Q) of the membrane and the separation coefficient ($\alpha$) thereof were both much lower than those of the polyallylamine-treated membrane prepared in Example 6.

Comparative Example 6

The epoxy-crosslinked polyacrylic acid membrane prepared in Example 6 (1) was evaluated in a similar manner to that described in Example 1 (3). The results are shown in Table 1.

The separation coefficient ($\alpha$) of the membrane was much lower than that of the polyallylamine-treated membrane prepared in Example 5.

Example 7

(1) Preparation of diamine-crosslinked polyacrylic acid composite membrane

A 0.19% aqueous solution of 1,3-diamino-2-hydroxypropane was added to a 4.7% aqueous solution of the same polyacrylic acid as that used in Example 1 (1) so as to give a ratio of polyacrylic acid to 1,3-diamino-2-hydroxypropane of 6:1. The mixture was cast on a polyether sulfone ultrafiltration membrane (mfd. by Daicel Chemical Industries Ltd.; DUS-40) with a wire bar having a wire diameter of 0.15 mm and heated in a clean oven of 140°0 C. for 30 minutes to form a coating layer. The same coating as that described above was made twice on the coating layer to obtain a composite membrane.

(2) Conversion into potassium salt

The diamine-crosslinked polyacrylic acid composite membrane prepared in Example 7 (1) was treated in a similar manner to that described in Example 5 (2) to obtain a diamine-crosslinked polypotassium acrylate composite membrane.

(3) Formation of polyion complex

The diamine-crosslinked polypotassium acrylate composite membrane prepared in Example 7 (2) was dipped in the same 0.5% basic solution of polyallylamine having a pH of 10.0 as that used in Example 5 (3) to form a polyion complex membrane.

(4) Evaluation of separation performances

The evaluation was carried out in a similar manner to that described in Example 1 (3).

(5) Evaluation results

The results are shown in Table 1.

Comparative Example 7

The diamine-crosslinked polypotassium acrylate composite membrane prepared in Example 7 (2) was evaluated in a similar manner to that described in Example 1 (3). The results are shown in Table 1.

The permeation rate (Q) and the separation coefficient ($\alpha$) of the membrane were much lower than those of the polyallylamine-treated membrane prepared in Example 7. Comparative Example 8

The diamine-crosslinked polyacrylic acid membrane prepared in Example 7 (1) was evaluated according to the same method as that described in Example 1 (3). The results are shown in Table 1.

Although the permeation rate (Q) of the membrane was higher than that of the polyallylamine-treated membrane prepared in Example 7, the separation coefficient ($\alpha$) of the former was much lower than that of the latter.

Example 8

(1) Preparation of epoxy-crosslinked polyacrylic acid composite membrane

A 1.0% aqueous solution of ethylene glycol diglycidyl ether was added to a 1.0% aqueous solution of the same polyacrylic acid as that used in Example 3 (1) so as to give a ratio of polyacrylic acid to ethylene glycol diglycidyl ether of 8:2. The mixture was cast on a polyether sulfone ultra-filtration membrane (mfd. by Daicel Chemical Industries Ltd.; DUS-40) with a wire bar having a wire diameter of 0.15 mm and heated in a clean oven of 100° C. for 10 minutes to form an epoxy-crosslinked polyacrylic acid coating layer. The same coating as that described above was made on the above coating layer to obtain a composite membrane.

(2) Formation of polyion complex

The epoxy-crosslinked polyacrylic acid composite membrane prepared in Example 8 (1) was dipped in the same 0.5% basic solution of polyallylamine of pH 10.0 as that used in Example 5 (3) to obtain a polyion complex membrane.

(3) Evaluation of separation performances

The evaluation was carried out in a similar manner to that described in Example 1 (3).

(4) Evaluation results

The results are shown in Table 1.

Example 9

(1) Preparation of polyacrylic acid-polyehtyleneimine polyion complex membrane The epoxy-crosslinked polyacrylic acid composite membrane prepared in Example 8 (1) was dipped in a 0.5% solution of polyethyleneimine in an ethanol/water (1:1) mixture at a room temperature for 10 minutes to obtain a polyion complex membrane.

(2) Evaluation of separation performances

The evaluation was carried out in a similar manner to that described in Example 1 (3).

(3) Evaluation results

The results are shown in Table 1.

Comparative Example 9

The epoxy-crosslinked polyacrylic acid composite membrane prepared in Example 8 (1) was evaluated according to a similar manner to that described in Example 1 (3). The results are shown in Table 1.

The separation coefficient (α) of the membrane was much lower than that of any of the polyion complex membranes prepared in Examples 8 to 10.

cast on a polyether sulfone ultrafiltration membrane (mfd. by Daicel Chemical Industries Ltd.; DUS-40) with a wire bar having a wire diameter of 0.15 mm and heated in a clean oven of 130° C. for 10 minutes to form an epoxy-crosslinked polyacrylic acid coating layer. The same coating as that described above was made on the above coating layer to obtain an epoxy-crosslinked polyacrylic acid composite membrane.

(2) Evaluation of separation performances

An ethanol/water mixture (of a weight ratio of 95:5) having a gauge pressure of 0.1 kg/cm$^2$ and a tempera-

TABLE 1

| | Polyacrylic acid | | Cationic polymer adsorption condition | Permeation rate Q(kg/m$^2$ · hr) | Separation coefficient |
|---|---|---|---|---|---|
| Ex. 1 | double coating | NH$_4$salt | PAAm acid | 0.69 | 107 |
| Ex. 2 | of 0.5% aq. | NH$_4$salt | PAAm basic | 0.85 | 323 |
| Comp. Ex. 1 | | NH$_4$salt | — | 0.54 | 38 |
| Ex. 3 | double coating | K salt | PAAm acid | 1.18 | 103 |
| Ex. 4 | of 1.0% aq. | K salt | PAAm basic | 1.64 | 158 |
| Comp. Ex. 2 | | K salt | — | 1.17 | 73 |
| Ex. 5 | crosslinked with melamine | K salt | PAAm basic | 1.15 | 625 |
| Comp. Ex. 3 | double coating | K salt | — | 0.40 | 890 |
| Comp. Ex. 4 | of 0.5% aq. | free acid | — | 0.98 | 42 |
| Ex. 6 | crosslinked with epoxy | K salt | PAAm basic | 0.99 | 2660 |
| Comp. Ex. 5 | | K salt | — | 0.42 | 330 |
| Comp. Ex. 6 | double coating of 0.5% aq. | free acid | — | 0.86 | 72 |
| Ex. 7 | crosslinked with diamine | K salt | PAAm acid | 0.47 | 1000 |
| Comp. Ex. 7 | | K salt | — | 0.29 | 140 |
| Comp. Ex. 8 | triple coating of 1.0% aq. | free acid | — | 0.70 | 79 |
| Ex. 8 | crosslinked with epoxy | free acid | PAAm basic | 0.45 | 1290 |
| Ex. 9 | | free acid | PEI basic | 0.31 | 505 |
| Comp. Ex. 9 | double coating of 1.0% aq. | free acid | — | 0.65 | 57 |

(Note)
melamine: hexamethoxymethylmelamine
epoxy: ethylene glycol diglycidyl ether
diamine: 1,3-diamino-2-hydroxypropane
PAAm: polyallylamine
PEI: polyethyleneimine Comparative Example 10

(1) Preparation of polyacrylic acid composite membrane

A 1% aqueous solution of a polyacrylic acid prepared in a laboratory having a viscosity of 24 cP was cast on a polyether sulfone ultrafiltration membrane (mfd. by Daicel Chemical Industries Ltd.: DUS-40) with a wire bar having a wire diameter of 0.15 mm and air-dried with dust-free air in a clean bench to form a polyacrylic acid coating layer. The same coating as that described above was made on the polyacrylic acid coating layer to obtain a polyacrylic acid composite membrane.

(2) Evaluation of separation performances

The polyacrylic acid skin layer of the above polyacrylic acid membrane was soluble in aqueous ethanol. Therefore, the evaluation of the membrane was impossible.

Comparative Example 11

(1) Preparation of epoxy-crosslinked polyacrylic acid composite membrane

A 1.0% aqueous solution of ethylene glycol diglycidyl ether was added to the same 1.0% aqueous solution of polyacrylic acid as that used in Comparative Example 10 (1) so as to give a ratio of polyacrylic acid to ethylene glycol diglycidyl ether of 9:1. The mixture was ture of 70° C. was fed to the primary side (skin layer side) of the membrane prepared in the above paragraph (1), while the secondary side thereof was evacuated to 5 Torr and closed. The ethanol/water gaseous mixture permeating the membrane enhanced the pressure of the secondary side up to 10 mm Hg. The total molar amount of the membrane-permeating gaseous mixture was calculated from the volume of the closed system and the time taken for the pressure increase. Further, the feed mixture and the gaseous mixture of the closed system were analyzed for composition by gas chromatography and the permeation rate and the separation coefficient were calculated from the results of this analysis. The permeation rate and separation coefficient thus determined were equal to those calculated from the results of the weighing of the membrane-permeating gaseous mixture trapped with liquid nitrogen and the analysis thereof for composition.

(3) Evaluation results

The results are shown in Table 2.

Example 10

The epoxy-crosslinked polyacrylic acid composite membrane prepared in Comparative Example 11 (1) was dipped in a 0.5% solution of polyallylamine hydrochloride in an ethanol/water (1:1) mixture at a room temperature for 10 minutes to obtain a polyion complex membrane. This membrane was evaluated according to the same method as that described in comparative Example 11 (2). The evaluation results are shown in Table 2. The membrane exhibited a remarkably high separation coefficient.

Example 11

The epoxy-crosslinked polyacrylic acid composite membrane prepared in Comparative Example 11 (1) was dipped in a 0.5% solution of polyethyleneimine in an ethanol/water (1:1) mixture at a room temperature for 10 minutes to obtain a polyion complex membrane. This membrane was evaluated according to the same manner as that described in Comparative Example 11 (2). Results are shown in Table 2. The separation coefficient of the membrane was nearly equal to that of the membrane prepared in Comparative Example 10.

Example 12

(1) Preparation of polypotassium acrylate composite membrane

The same aqueous solution of polyacrylic acid as that used in Comparative Example 10 (1) was neutralized with a 1N aqueous solution of potassium hydroxide and diluted with water to obtain a 0.5% aqueous solution of polypotassium acrylate. This solution was cast on a polyether sulfone ultrafiltration membrane (mfd. by Daicel Chemical Industries Ltd.; DUS-40) with a wire bar having a wire diameter of 0.15 mm and air-dried with dust-free air in a clean bench to form a polypotassium acrylate coating layer. The same coating as that described above was made on the above coating layer to obtain a composite membrane.

(2) Evaluation of separation performances

The polypotassium acrylate composite membrane prepared in the above paragraph (1) peeled off by the contact with aqueous ethanol. Therefore, the evaluation of the composite membrane was impossible.

Comparative Example 13

(1) Preparation of melamine-crosslinked polypotassium acrylate composite membrane A 0.5% aqueous solution of hexamethoxymethylmelamine was added to a 0.5% aqueous solution of the same polyacrylic acid as that used in Comparative Example 10 (1) so as to give a ratio of polyacrylic acid to hexamethoxymethylmelamine of 8:2. The mixture was cast on a polyether sulfone ultrafiltration membrane (mfd. by Daicel Chemical Industries Ltd.; DUS-40) with a wire bar having a wire diameter of 0.15 mm and heated in a clean oven of 100° C. for 10 minutes to obtain a melamine-crosslinked polyacrylic acid composite membrane. This membrane was dipped in a 0.1% aqueous solution of potassium hydroxide at a room temperature for 10 minutes to obtain a melamine-crosslinked polypotassium acrylate composite membrane.

(2) Evaluation of separation performances

The evaluation was carried out according to the same method as that described in Comparative Example 11 (2).

(3) Evaluation results

The results are shown in Table 2.

Example 12

The melamine-crosslinked polypotassium acrylate composite membrane prepared in Comparative Example 13 (1) was dipped in a 0.5% solution of polyallylamine hydrochloride in an ethanol/water (1:1) mixture at a room temperature for 10 minutes to obtain a polyion complex membrane. This membrane was evaluated according to the same method as that described in Comparative Example 11 (2). Results are shown in Table 2.

Comparative Example 14

(1) Preparation of polyethyleneimine composite membrane

An 8% aqueous solution of polyethyleneimine was cast on a polyether sulfone ultrafiltration membrane (mfd. by Daicel Chemical Industries Ltd.; DUS-40) with a wire bar having a wire diameter of 0.15 mm and air-dried with dust-free air in a clean bench to obtain a polyethyleneimine composite membrane.

(2) Evaluation of separation performances

The polyethyleneimine skin layer of the composite film prepared in the above paragraph (1) was soluble in aqueous ethanol, so that the evaluation of the membrane was impossible.

Comparative Example 15

(1) Preparation of epoxy-crosslinked polyethyleneimine composite membrane

An 8% aqueous solution of diglycidyl ether was added to the same 8% aqueous solution of polyethyleneimine as that used in Comparative Example 14 (1) so as to give a ratio of polyethyleneimine to diglycidyl ether of 2:1. The mixture was cast on a polyether sulfone ultrafiltration membrane (mfd. by Daicel Chemical Industries, Ltd.; DUS-40) with a wire bar having a wire diameter of 0.15 mm and heated in a clean oven of 130° C. for 10 minutes to obtain an epoxy-crosslinked polyethyleneimine composite membrane.

(2) Evaluation of separation performances

The evaluation was carried out according to the same manner as that described in Comparative Example 11 (2).

(3) Evaluation results

The results are shown in Table 3.

Example 13

The epoxy-crosslinked polyethyleneimine composite membrane prepared in Comparative Example 15 (1) was dipped in a 1% aqueous solution of polyacrylic acid at a room temperature for 10 minutes to form a polyion complex membrane. This membrane was evaluated according to the same manner as that described in Comparative Example 11 (2). The results are shown in Table 3. The membrane exhibited a high separation coefficient.

TABLE 2

Separation performances of membrane containing polyion complex of polyacrylic acid

| | Anionic polymer | Crosslinking process | Preparation condition of membrane | Adsorbed polymer | Permeation rate (kg/m²hr) | Separation coefficient α H₂O EtOH |
|---|---|---|---|---|---|---|
| Comp. Ex. 10 | polyacrylic acid | uncrosslinked | 1.0% dope, double coating | — | impossible evaluation (due to dissolution) | |
| Comp. Ex. 11 | " | epoxy-crosslinked | " | — | 0.65 | 57 |
| Ex. 10 | " | " | " | polyallyl-amine | 0.45 | 1290 |
| Ex. 11 | " | epoxy-crosslinked | " | polyethy-leneimine | 0.31 | 500 |
| Comp. Ex. 12 | polypotassium acrylate | uncrosslinked | 0.5% dope, double coating | — | impossible evaluation (due to peeling) | |
| Comp. Ex. 13 | " | melamine-crosslinked | " | — | 0.42 | 330 |
| Ex. 12 | " | " | " | polyallyl-amine | 1.15 | 625 | membrane: composite membrane containing a polyether sulfone porous membrane as a support (prepared by coating with a wire bar having a wire diameter of 0.15 mm)
crosslinking agent:epoxy:ethylene glycol diglycidyl ether melamine:hexamethoxymethylmelamine
evaluation:pervaporation method with 95% ethanol of 70° C.

TABLE 3

Separation performances of membrane containing polyion complex of polyethyleneimine

| | Cationic polymer | Crosslinking process | Preparation condition of membrane | Adsorbed polymer | Permeation rate Q (kg/m²/hr) | Separation coefficient α H₂O EtOH |
|---|---|---|---|---|---|---|
| Comp. Ex. 14 | polyethyleneimine | uncross-linked | 8% dope, single coating | — | impossible evaluation (due to dissolution) | |
| Comp. Ex. 15 | " | epoxy-crosslinked | " | — | 4.23 | 16 |
| Ex. 13 | " | " | " | polyacry-lic acid | 0.52 | 320 | membrane:composite membrane containing a polyether sulfone porous membrane as a support (prepared by coating with a wire bar having a wire diameter of 0.15 mm)
Crosslinking agent:epoxy:ethylene glycol diglycidyl ether
evaluation:pervaporation method with 95% ethanol of 70° C.

Example 14

(1) Preparation of polyacrylic acid composite membrane

A 1.0% aqueous solution of ethylene glycol diglycidyl ether was added to a 1.0% aqueous solution of a polyacrylic acid prepared in a laboratory (viscosity of 1% aqueous solution: 42 cP) so as to give a ratio of polyacrylic acid to ethylene glycol diglycidyl ether of 9:1. The mixture was cast on a polyether sulfone ultrafiltration membrane (mfd. by Daicel Chemical Industries Ltd.; DUS-40) with a wire bar having a wire diameter of 0.15 mm and heated in a clean oven of 140° C. for 10 minutes to form a coating layer. The same coating as that described above was made on the coating layer twice to obtain an epoxy-crosslinked polyacrylic acid composite membrane.

(2) Formation of polyion complex

The epoxy-crosslinked polyacrylic acid composite membrane prepared in Example 14 (1) was dipped in a 2.0% aqueous solution of a polycation of quaternary ammonium type shown in the note of Table 4 as PCA-101 and rinsed in deionized water to remove excessive PCA-101. Thus, a polyion complex membrane was obtained.

(3) Evaluation of separation performances

An ethanol/water mixture (of a weight ratio of 95:5) having a gauge pressure of 0.1 kg/cm² and a temperature of 70° C. was fed to the primary side (skin layer side) of the membrane prepared in the above paragraph (2), while the secondary side thereof was closed. The ethanol/water gaseous mixture permeating the membrane enhanced the pressure of the secondary side up to 15 mm Hg. The total molar amount of the membrane-permeating gaseous mixture was calculated from the volume of the closed system and the time taken for the pressure increase. Further, the feed mixture and the gaseous mixture of the closed system were analyzed for composition by gas chromatography and the permeation rate and the separation coefficient were calculated from the results of this analysis. The permeation rate and separation coefficient thus determined were equal to those calculated from the results of the weighing of the membrane-permeating gaseous mixture trapped with liquid nitrogen and the analysis thereof for composition.

(4) Evaluation results

The results are shown in Table 4.

Example 15

The same procedure as that described in Example 14 was repeated except that the 2.0% aqueous solution of PCA-101 to be used in the paragraph (2) for the dipping of the epoxy-crosslinked polyacrylic acid composite membrane was replaced by a 2.0% aqueous solution of PCA-107 having a structure shown in the note of Table 4. The obtained membrane was evaluated for separation performances and the results are shown in Table 4.

Example 16

The same procedure as that described in Example 14 was repeated except that the 2.0% aqueous solution of PCA-101 to be used in the paragraph (2) for the dipping of the epoxy-crosslinked polyacrylic acid composite membrane was replaced by a 2.0% aqueous solution of PAL-2 having a structure shown in the note of Table 4. The obtained membrane was evaluated for separation performances and the results thereof are shown in Table 4.

TABLE 4

Separation performances of membrane containing polyion complex of polyacrylic acid

| | Post-treatment of epoxy-crosslinked polyacrylic acid composite membrane | Separation performance Permeation rate (kg/m² · hr) | Separation coefficient $\alpha_{ethanol}^{water}$ |
|---|---|---|---|
| Example 14 | PCA-101, 2% aq., 10 min. | 0.79 | 1710 |
| Example 15 | PCA-107, 2% aq., 10 min. | 0.83 | 1960 |
| Example 16 | PAL-2, 2% aq., 10 min. | 0.34 | 830 |

Note Chemical structures of polycation

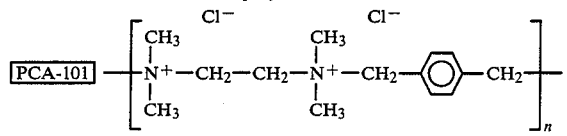

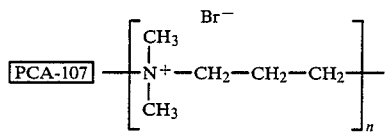

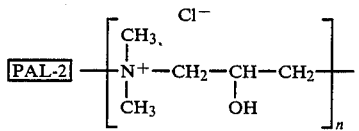

Example 17

An aqueous solution containing polyacrylic acid and sodium 2,5-diaminobenzenesulfonate at a ratio of the number of carboxyl groups to that of amino groups of 13:1 and having a polyacrylic acid concentration of 0.5% was cast on a polyether sulfone ultrafiltration membrane (mfd. by Daicel Chemical Industries Ltd.; DUS-40) with a wire bar having a wire diameter of 0.15 mm and heated in a clean oven of 140° C. for 30 minutes to form a sodium diaminobenzenesulfonate-crosslinked polyacrylic acid coating layer. The same coating as that described above was repeated on the coating layer twice to obtain a composite membrane.

Example 18

The same procedure as that described in Example 17 was repeated except that no sodium 2,5-diaminobenzenesulfonate was added. A composite membrane was obtained.

Example 19

An aqueous solution containing polyacrylic acid and sodium 2,5-diaminobenzenesulfonate at a ratio of the number of carboxyl groups to that of amino groups of 6:1 and having a polyacrylic acid concentration of 1% was cast on a polyether sulfone ultrafiltration membrane (mfd. by Daicel Chemical Industries Ltd.; DUS-40) with a wire bar having a wire diameter of 0.15 mm and heated in a clean oven of 140° C. for 30 minutes to form a sodium diaminobenzenesulfonate-crosslinked polyacrylic acid coating layer. The same coating as that described above was repeated on the coating layer twice to obtain a composite membrane.

Example 20

The same procedure as that described in Example 19 was repeated except that the ratio of the number of carboxyl groups to that of amino groups was 13:1. Thus, a composite membrane was obtained.

Example 21

A 0.5% aqueous solution of hexamethoxymethylmelamine was added to a 0.5% aqueous solution of polyacrylic acid so as to give a ratio of the number of carboxyl groups to that of methylol groups of 2:1. The mixture was cast on a polyether sulfone ultrafiltration membrane (mfd. by Daicel Chemical Industries Ltd.; DUS-40) with a wire bar having a wire diameter of 0.15 mm and heated in a clean oven of 100° C. for 10 minutes to form a hexamethoxymethylmelamine-crosslinked polyacrylic acid coating layer. The same coating as that described above was made on the coating layer to obtain a composite membrane.

Example 22

The same procedure as that described in Example 21 was repeated except that the coating was repeated thrice in total.

Comparative Example 16

The composite membrane prepared in Example 17 was evaluated according to the pervaporation method using a 95% aqueous solution of ethanol of 70° C. The results are shown in Table 5. The membrane exhibited a high permeation rate of 3.

Example 23

The composite membrane prepared in Example 20 was dipped in a 0.5% solution of polyallylamine hydrochloride adjusted to pH 10 with a 1N aqueous solution of potassium hydroxide to obtain a polyion complex membrane. This membrane was evaluated according to the pervaporation method using a 95% aqueous solution of ethanol of 70° C. The results are shown in Table 5.

Example 24

The composite membrane prepared in Example 17 was dipped in a 2% aqueous solution of a polymer of the ionene type (PCA-101) having a structure represented by the following structure:

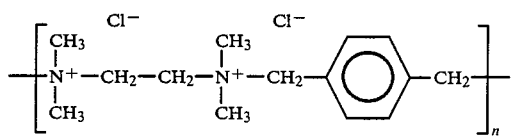

to obtain a polyion complex membrane. This membrane was evaluated according to the pervaporation method using a 95% aqueous ethanol solution of 70° C. The results are shown in Table 5. The membrane exhibited a remarkably high permeation rate and a remarkably high separation coefficient.

TABLE 5

| | Material of membrane A | Crosslinking agent B | The number of functional groups of A:that of B | Post-treatment | Performances of membrane | |
|---|---|---|---|---|---|---|
| | | | | | Permeation rate kg/m²hr | Separation coefficient $\alpha_{ethanol}{}^{water}$ |
| Comp. Ex. 16 | polyacrylic acid | sodium 2,5-diamino-benzenesulfonate | 13:1 | none | 3 | 50 |
| Ex. 23 | " | " | 13:1 | converted into poly-ion complex with poly-allylamine | 0.61 | 1000 |
| Ex. 24 | " | " | 13:1 | converted into poly-ion complex with PCA 101 | 0.94 | 1880 |

(Note)
The evaluation of membrane was made by using 95% ethanol of 70° C. as a feed, and the results shown in the above Table are ones determined by initial measurements.

What is claimed is:

1. A process comprising separating water from an aqueous solution of an organic substance or a gaseous mixture of water with an organic substance by pervaporation or vapor permeation, by contacting said solution or said mixture with a membrane made of a synthetic polymer having an anionic group associated with a synthetic polymer having a cationic group by an ionic bond to form a polyion complex on the surface of the membrane and/or in the membrane under conditions effective to cause water vapor to permeate through said membrane.

2. A process as set forth in claim 1, wherein the synthetic polymer having an anionic group constituting the polyion complex is crosslinked with a crosslinking agent which can form a covalent bond with the polymer.

3. A process as set forth in claim 1, wherein said synthetic polymer having an anionic group constituting the polyion complex is polyacrylic acid or a salt thereof with a metal or ammonium.

4. A process as set forth in claim 1, wherein the cationic group of the synthetic polymer having a cationic group constituting the polyion complex is a primary, secondary, tertiary or quaternary amine.

5. A process as set forth in claim 1, wherein the synthetic polymer having a cationic group constituting the polyion complex is polyallylamine.

6. A process as set forth in claim 1, wherein the synthetic polymer having a cationic group constituting the polyion complex is polyethyleneimine.

7. A process as set forth in claim 1, in which the membrane is a composite membrane comprising a skin layer essentially made of said polyion complex and a porous support layer.

8. A process as set forth in claim 7, wherein the synthetic polymer having a cationic group is a polymer having a quaternary ammonium salt group in its backbone chain.

9. A process as set forth in claim 8, wherein the polymer having a quaternary ammonium salt group in its backbone chain has a structure represented by the following structural formula:

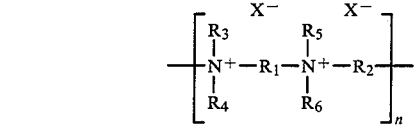

wherein $R_1$ and $R_2$ may be the same or different from each other and each stand for an alkylene group having at least 2 carbon atoms or a hydroxyalkylene, alicyclic or aromatic group; $R_3$, $R_4$, $R_5$ and $R_6$ may be the same or different and each stand for an alkyl or hydroxyalkyl group having 1 to 3 carbon atoms and $X^-$ is a counter halide ion.

10. A process as set forth in claim 8, wherein the polymer having a quaternary ammonium salt group in its backbone chain has a structure represented by the following structural formula:

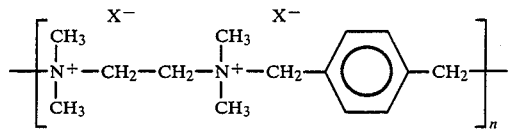

wherein $X^-$ is a counter halide ion.

11. A process as set forth in claim 8, wherein the polymer having a quaternary ammonium salt group in its backbone chain has a structure represented by the following structural formula:

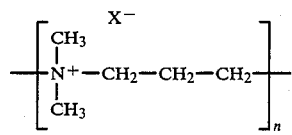

wherein $X^-$ is a counter halide ion.

12. A process as set forth in claim 8, wherein the polymer having a quaternary ammonium salt group in its backbone chain has a structure represented by the following structural formula:

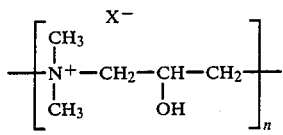

wherein X⁻ is a counter halide ion.

13. A process comprising separating water from a mixture thereof with an organic substance, by contacting said mixture with a membrane consisting of a porous polyether sulfone substrate coated with a layer of a polyion complex consisting of an epoxy cross-linked polyacrylic acid anionic polymer ionically bonded with a cationic polymer having recurring units of the formula

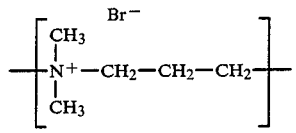

under conditions effective to cause water vapor to permeate through said membrane while preventing said organic substance from permeating through said membrane.

14. A process comprising separating water from a mixture thereof with an organic substance by contacting said mixture with a membrane consisting essentially of a porous substrate made of a material selected from the group consisting of polysulfone, polyether sulfone, polyacrylonitrile, cellulose ester, polycarbonate and polyvinylidene chloride, said substrate being coated with a layer of a polyion complex consisting of an anionic polymer ionically bonded with a cationic polymer, said anionic polymer being selected from the group consisting of homopolymers and copolymers of acrylic acid, methacrylic acid, styrenesulfonic acid, vinylsulfuric acid, alginic acid, carboxymethylcellulose, sulfoethylcellulose and metal and ammonium salts thereof, said anionic polymer being cross-linked with a cross-linking agent which can form a covalent bond, said cross-linking agent being selected from the group consisting of epoxy, methylomelamine, amine and isocyanate compounds, said cationic polymer having recurring units of the formula

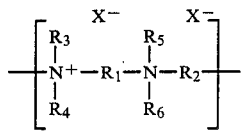

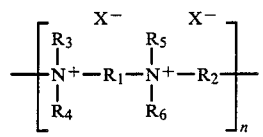

wherein $R_1$ and $R_2$ cam be the same or different and each is selected from the group consisting of alkylene and hydroxyalkylene having at least 2 carbon atoms, alicyclic groups and aromatic groups, and $R_3$, $R_4$, $R_5$ and $R_6$ are the same or different and each is selected from the group consisting of alkyl and hydroxyalkyl having 1 to 3 carbon atoms and X is a halide counterion, said contacting being carried out under conditions effective to cause water vapor to permeate through said membrane while preventing said organic substance from permeating through said membrane.

* * * * *

UNITED STATES PATENT AND TRADEMARK OFFICE
CERTIFICATE OF CORRECTION

PATENT NO. : 4,871,461
DATED : October 3, 1989
INVENTOR(S) : Hiroki KARAKANE et al It is certified that error appears in the above-identified patent and that said Letters Patent is hereby corrected as shown below:

Column 24, lines 20-25; delete this formula in its entirety.

Signed and Sealed this

Eighteenth Day of December, 1990

Attest:

HARRY F. MANBECK, JR.

*Attesting Officer*  *Commissioner of Patents and Trademarks*